(12) United States Patent
Coşkun et al.

(10) Patent No.: US 11,185,070 B2
(45) Date of Patent: Nov. 30, 2021

(54) SOLUTION FOR PRESERVATION OF ORGANS PRIOR TO ORGAN TRANSPLANTATION

(71) Applicant: ACIBADEM MEHMET ALI AYDINLAR ÜNIVERSITESI, Istanbul (TR)

(72) Inventors: Abdurrahman Coşkun, Istanbul (TR); Ibrahim Ünsal, Istanbul (TR); Mustafa Serteser, Istanbul (TR); Ömer Günal, Istanbul (TR)

(73) Assignee: ACIBADEM MAHMET ALI AYDINLAR UNIVERSITESI, Istanbul (TR)

( * ) Notice: Subject to any disclaimer, the term of this patent is extended or adjusted under 35 U.S.C. 154(b) by 150 days.

(21) Appl. No.: 16/345,167

(22) PCT Filed: Oct. 18, 2017

(86) PCT No.: PCT/TR2017/050506
§ 371 (c)(1),
(2) Date: Apr. 25, 2019

(87) PCT Pub. No.: WO2018/226177
PCT Pub. Date: Dec. 13, 2018

(65) Prior Publication Data
US 2019/0281817 A1    Sep. 19, 2019

(30) Foreign Application Priority Data

Oct. 25, 2016 (TR) .................... 2016/15137

(51) Int. Cl.
*A01N 1/02* (2006.01)
(52) U.S. Cl.
CPC .................. *A01N 1/0226* (2013.01)
(58) Field of Classification Search
None
See application file for complete search history.

(56) References Cited

U.S. PATENT DOCUMENTS

| | | | | |
|---|---|---|---|---|
| 5,654,266 A | * | 8/1997 | Chen ............... | A01N 1/0226 514/21.92 |
| 2009/0017439 A1 | | 1/2009 | Shimko et al. | |
| 2011/0008763 A1 | * | 1/2011 | Lee ............... | A01N 1/0221 435/1.2 |
| 2013/0130225 A1 | * | 5/2013 | C.Y. Chang ........ | A01N 1/0226 435/1.2 |
| 2015/0164065 A1 | * | 6/2015 | Dobson ............ | A61K 31/7076 435/1.1 |

FOREIGN PATENT DOCUMENTS

| | | |
|---|---|---|
| CN | 101199273 A | 6/2008 |
| WO | 92/01593 A1 | 4/1992 |
| WO | 2012/164321 A1 | 12/2012 |

OTHER PUBLICATIONS

Aslaner, A., et al. Effect of Melatonin on Kidney Cold Ischemic Preservation Injury. Int J Clinical Experimental Medicine 6(9)794-798, 2013. (Year: 2013).*
International Search Report and Written Opinion dated Dec. 5, 2018 for Application No. PCT/TR2017/050506.
Espacenet English abstract of CN 101199273 A.

* cited by examiner

*Primary Examiner* — Ralph J Gitomer
(74) *Attorney, Agent, or Firm* — Ladas & Parry LLP

(57) ABSTRACT

The present invention is a solution for preservation of organs prior to organ transplantation used in reducing the damage occurring during transportation and waiting of liver and kidney prior to transplantation. Accordingly, the subject matter solution is characterized by comprising Raffinose in the range of 25-35 mmol/L, Lactobionate in the range of 80-120 mmol/L, HES (Hydroxy-ethyl starch) in the range of 0-4% g, $SO_4^{2-}$ in the range of 4.5-5.5 mmol/L, Adenosine in the range of 4.5-5.5 mmol/L, Glutathione in the range of 2.7-3.3 mmol/L, Allopurinol in the range of 0.9-1.1 mmol/l, $Na^+$ in the range of 27-33 mmol/L, $K^+$ in the range of 115-125 mmol/L, $Mg^+$ in the range of 4.5-5.5 mmol/L, Histidine/Histidine-HCl in the range of (25-30)/(2.5-3.0) mmol/L, Melatonin in the range of 30-50 mg/L, Glucosamine in the range of 20-100 mg/L.

20 Claims, No Drawings

SOLUTION FOR PRESERVATION OF ORGANS PRIOR TO ORGAN TRANSPLANTATION

RELATED APPLICATION

This application is an application under 35 U.S.C. 371 of International Application No. PCT/TR2017/050506 filed on Oct. 18, 2017, the entire contents of which are incorporated herein by reference.

TECHNICAL FIELD

The present invention relates to a solution for preservation of organs prior to organ transplantation used for reducing the damage which occurs during transfer and waiting of liver and kidney prior to transplantation.

PRIOR ART

Organ transplantation has been clinically applied since 1970s. The organ, which has been removed for transplantation, is basically kept in a hypothermic medium and it is preserved by using preservation solutions. For the hypothermic medium, generally temperatures between +2° C. and +6° C. are preferred. As the preservation solution, solutions with different ingredients and names for preservation of different organs are used. The ingredients of these solutions are continued to be modified as from the day where they are begun to be produced. Despite of all of these modifications, there are advantages and disadvantages of preservation solutions when compared with each other. Despite of all of the studies which have been made, the functional protection durations of solid organs are delimited with hours. Tissue damage rapidly occurs in the organ, of which the blood circulation is interrupted, due to oxygen deficiency and insufficiency of substances required for energy and accumulation of metabolic wastes. If no precaution is taken, the tissue loses all of its functionality within 30-60 minutes. However, in blood banks, the blood can be preserved for 35 days and erythrocytes can be preserved for 42 days. When comparison is made, the preservation durations of organs are substantially insufficient.

In the present applications, particularly preservation solutions from University of Wisconsin and named as Histidine-tryptophan-ketoglutarate are frequently preferred for preservation of organs. However, these frequently used solutions and nearly all of the other solutions used have small harmful effects. For instance, HES (Hydroxy Ethyl Starch), which is among the main components of the solution of University of Wisconsin, is nephrotoxic and moreover, it reduces the penetration of the solution into the tissue since it increases viscosity.

As a result, because of all of the abovementioned problems, an improvement is required in the related technical field.

BRIEF DESCRIPTION OF THE INVENTION

The present invention relates to a solution for preservation of organs prior to organ transplantation, for eliminating the above mentioned disadvantages and for bringing new advantages to the related technical field.

The main object of the present invention is to provide a solution for preservation of organs prior to organ transplantation where the damages which may occur in livers and kidneys prior to transplantation can be reduced.

In order to realize all of the abovementioned objects and the objects which are to be deducted from the detailed description below, the present invention is a solution for preservation of organs prior to organ transplantation used in reducing the damage occurring during transportation and waiting of liver and kidney prior to transplantation. Accordingly, said solution for preservation of organs prior to organ transplantation is characterized by comprising Raffinose in the range of 25-35 mmol/L, Lactobionate in the range of 80-120 mmol/L, HES (Hydroxy-ethyl starch) in the range of 0-4% g, $SO_4^{2-}$ in the range of 4.5-5.5 mmol/L, Adenosine in the range of 4.5-5.5 mmol/L, Glutathione in the range of 2.7-3.3 mmol/L, Allopurinol in the range of 0.9-1.1 mmol/L, $Na^+$ in the range of 27-33 mmol/L, $K^+$ in the range of 115-125 mmol/L, $Mg^+$ in the range of 4.5-5.5 mmol/L, Histidine/Histidine-HCl in the range of (25-30)/(2.5-3.0) mmol/L, Melatonin in the range of 30-50 mg/L, Glucosamine in the range of 20-100 mg/L. Thus, the organ can be preserved in an effective manner during transportation and waiting of the organ prior to transplantation.

In a preferred embodiment of the invention, the solution comprises 30 mmol/L of Raffinose.

In another preferred embodiment of the invention, the solution comprises 100 mmol/L of Lactobionate.

In another preferred embodiment of the invention, the solution comprises 5 mmol/L $H_2PO_4^-$.

In another preferred embodiment of the invention, the solution comprises 20 mmol/L of $HPO_4^{2-}$.

In another preferred embodiment of the invention, the solution comprises 4% g HES (Hydroxy-ethyl starch).

In another preferred embodiment of the invention, the solution comprises 5 mmol/L of $SO_4^{2-}$.

In another preferred embodiment of the invention, the solution comprises 5 mmol/L of Adenosine.

In another preferred embodiment of the invention, the solution comprises 3 mmol/L of Glutathione.

In another preferred embodiment of the invention, the solution comprises 1 mmol/L of Allopurinol.

In another preferred embodiment of the invention, the solution comprises 30 mmol/L of $Na^+$.

In another preferred embodiment of the invention, the solution comprises 120 mmol/L of $K^+$.

In another preferred embodiment of the invention, the solution comprises 5 mmol/L of $Mg^+$.

In another preferred embodiment of the invention, the solution comprises 30/3 mmol/L of Histidine/Histidine-HCl.

In another preferred embodiment of the invention, the solution comprises 30 mg/L of Melatonin.

In another preferred embodiment of the invention, the solution comprises 20 mg/L of Glucosamine. Thus, extracellular structures can be preserved.

In another preferred embodiment of the invention, the pH of the solution is between 7.35 and 7.45.

In another preferred embodiment of the invention, the pH of the solution is 7.4.

In another preferred embodiment of the invention, at least one of $H_2PO_4^-$ ve $HPO_4^{2-}$ is used for pH adjustment of the solution for preservation of organs prior to organ transplantation.

In another preferred embodiment of the invention, filters having pores of 0.22 micrometers are used in sterilization. Thus, efficient sterilization can be provided.

DETAILED DESCRIPTION OF THE INVENTION

In this detailed description, the subject matter solution for preservation of organs prior to organ transplantation is explained with references to examples without forming any restrictive effect only in order to make the subject more understandable.

Said solution for preservation of organs prior to organ transplantation can be used for reducing the damage which occurs during transfer and waiting of the organs essentially in liver and kidney transplantation.

The pH value of the solution for preservation of organs prior to organ transplantation is preferably between 7.35 and 7.45. Besides, the usage ranges of the components of solution for preservation of organs prior to organ transplantation are basically as follows:

| COMPONENT NAME | USAGE RANGES |
|---|---|
| Raffinose | 25-35 mmol/L |
| Lactobionate | 80-120 mmol/L |
| $H_2PO_4^-$ | It may change. |
| $HPO_4^{2-}$ | It may change. |
| HES (Hydroxyethyl starch) | 0-4% g |
| $SO_4^{2-}$ | 4.5-5.5 mmol/L |
| Adenosine | 4.5-5.5 mmol/L |
| Glutathione | 2.7-3.3 mmol/L |
| Allopurinol | 0.9-1.1 mmol/l |
| $Na^+$ | 27-33 mmol/L |
| $K^+$ | 115-125 mmol/L |
| $Mg^+$ | 4.5-5.5 mmol/L |
| Histidine/Histidine-HCl | (25-30)/(2.5-3.0) mmol/L |
| Melatonin | 30-50 mg/L |
| Glucosamine | 20-100 mg/L |

In an exemplary embodiment in accordance with the usage ranges of the abovementioned components, the pH value of the solution for preservation of organs prior to organ transplantation is 7.40. Moreover, solution for preservation of organs prior to organ transplantation comprises 30 mmol/L Raffinose, 100 mmol/L Lactobionate, 5 mmol/L $H_2PO_4^-$, 20 mmol/L $HPO_4^{2-}$, 4% g HES (Hydroxy-ethyl starch), 5 mmol/L $SO_4^{2-}$, 5 mmol/L Adenosine, 3 mmol/L Glutathione, 1 mmol/L Allopurinol, 30 mmol/L $Na^+$, 120 mmol/L $K^+$, 5 mmol/L $Mg^+$, 30/3 mmol/L Histidine/Histidine-HCl, 30 mg/L Melatonin and 20 mg/L Glucosamine. Glucosamine can preserve the extra-cellular structures.

HES (Hydroxy-ethyl starch) is nephrotoxic (it gives damage to kidneys), and moreover, it reduces the penetration of the solution into the tissue since it increases viscosity. Thus, the amount of HES in the subject matter solution for preservation of organs prior to organ transplantation is approximately reduced 20% when compared with the present solutions for preservation of organs prior to organ transplantation. Thus, more success can be provided in functional protection of the organ.

The preparation of the solution for preservation of organs prior to organ transplantation whose details are given above is as follows:

In preparation of the solution for preservation of organs prior to organ transplantation, phosphate buffer is used as solvent. All of the components except melatonin are prepared.

Melatonin is prepared in a dark medium and it is added into the mixture formed by the other components. Melatonin is prepared by means of dissolving in ethanol. Melatonin has a very effective antioxidant property in the organism.

Afterwards, the pH value of the solution for preservation of organs prior to organ transplantation is adjusted. $H_2PO_4^-$ and $HPO_4^{2-}$ are used for pH adjustment and pH is brought to the range between 7.35-7.45.

Addition of melatonin to the mixture formed by the components prepared in the first stage, adjustment of pH value in the final stage and all other processes are preferably realized at temperature of 23° C.

After preparing the solution for preservation of organs prior to organ transplantation, the solution is sterilized before packaging. Filters having pores with size of 0.22 micrometers are used for sterilization.

Since melatonin is a chemical which is affected by light, the prepared solution for preservation of organs prior to organ transplantation is preserved at temperature of 2° C.-4° C. by being protected from light until it is used.

Thanks to the subject matter solution for preservation of organs prior to organ transplantation;

The organ is preserved for a longer duration when compared with the present preservation solutions.

The integrity of the cellular and extra-cellular structures of the organ is better protected against the destruction created by hypothermia and ischemia.

Since the viscosity is lower when compared with the present preservation solutions, it can better penetrate into the micro-vascular structures of the organ.

Since the HES proportion is lower when compared with the present preservation solutions, it has less nephrotoxic effect.

The protection scope of the present invention is set forth in the annexed Claims and cannot be restricted to the illustrative disclosures given above, under the detailed description. It is because a person skilled in the relevant art can obviously produce similar embodiments under the light of the foregoing disclosures, without departing from the main principles of the present invention.

The invention claimed is:

1. A solution for preservation of organs prior to organ transplantation used in reducing the damage occurring during transportation and storage of liver and kidney prior to transplantation, said solution comprising Raffinose in the range of 25-35 mmol/L, Lactobionate in the range of 80-120 mmol/L, HES (Hydroxy-ethyl starch) in the range of 0-4% g (0-40 gram/L), $SO_4^{2-}$ in the range of 4.5-5.5 mmol/L, Adenosine in the range of 4.5-5.5 mmol/L, Glutathione in the range of 2.7-3.3 mmol/L, Allopurinol in the range of 0.9-1.1 mmol/l, $Na^+$ in the range of 27-33 mmol/L, $K^+$ in the range of 115-125 mmol/L, $Mg^+$ in the range of 4.5-5.5 mmol/L, Histidine/Histidine-HCl in the range of (25-30)/(2.5-3.0) mmol/L, Melatonin in the range of 30-50 mg/L, Glucosamine in the range of 20-100 mg/L.

2. The solution for preservation of organs prior to organ transplantation according to claim 1, wherein the solution comprises 30 mmol/L of Raffinose.

3. The solution for preservation of organs prior to organ transplantation according to claim 1, wherein the solution comprises 100 mmol/L of Lactobionate.

4. The solution for preservation of organs prior to organ transplantation according to claim 1, wherein the solution further comprises 5 mmol/L of $H_2PO_4^-$.

5. The solution for preservation of organs prior to organ transplantation according to claim 1, wherein the solution further comprises 20 mmol/L of $HPO_4^{2-}$.

6. The solution for preservation of organs prior to organ transplantation according to claim 1, wherein the solution comprises 4% g HES (Hydroxyethyl starch).

7. The solution for preservation of organs prior to organ transplantation according to claim 1, wherein the solution comprises 5 mmol/L of $SO_4^{2-}$.

8. The solution for preservation of organs prior to organ transplantation according to claim 1, wherein the solution comprises 5 mmol/L of Adenosine.

9. The solution for preservation of organs prior to organ transplantation according to claim 1, wherein the solution comprises 3 mmol/L of Glutathione.

10. The solution for preservation of organs prior to organ transplantation according to claim 1, wherein the solution comprises 1 mmol/L of Allopurinol.

11. The solution for preservation of organs prior to organ transplantation according to claim 1, wherein the solution comprises 30 mmol/L of $Na^+$.

12. The solution for preservation of organs prior to organ transplantation according to claim 1, wherein the solution comprises 120 mmol/L of $K^+$.

13. The solution for preservation of organs prior to organ transplantation according to claim 1, wherein the solution comprises 5 mmol/L of $Mg^+$.

14. The solution for preservation of organs prior to organ transplantation according to claim 1, wherein the solution comprises 30/3 mmol/L of Histidine/Histidine-HCl.

15. The solution for preservation of organs prior to organ transplantation according to claim 1, wherein the solution comprises 30 mg/L of Melatonin.

16. The solution for preservation of organs prior to organ transplantation according to claim 1, wherein the solution comprises 20 mg/L of Glucosamine.

17. The solution for preservation of organs prior to organ transplantation according to claim 1, wherein the pH of the solution is between 7.35 and 7.45.

18. The solution for preservation of organs prior to organ transplantation according to claim 17, wherein the pH of the solution is 7.4.

19. The solution for preservation of organs prior to organ transplantation according to claim 1, wherein at least one of $H_2PO_4^-$ and $HPO_4^{2-}$ is used for pH adjustment of the solution.

20. The solution for preservation of organs prior to organ transplantation according to claim 1, wherein filters having pores of 0.22 micrometers are used in sterilization.

* * * * *